March 13, 1956   J. MAHO   2,737,878
APPARATUS FOR AERATING AND DRYING GRANULAR MATERIALS
Filed March 9, 1953   3 Sheets-Sheet 1

INVENTOR:
JACQUES MAHO
BY
Richardson, David and Nordon
ATTORNEYS.

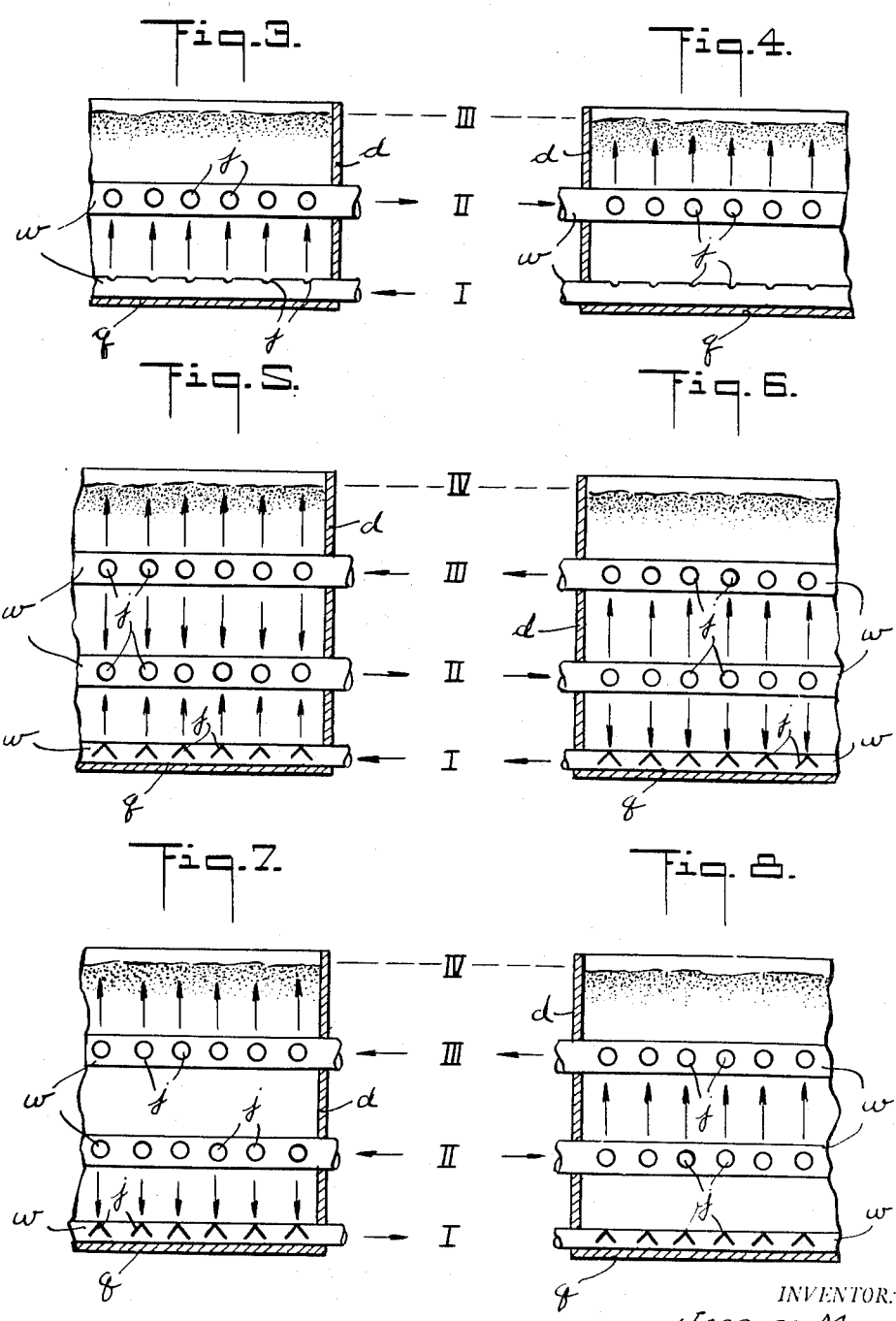

INVENTOR:
Jacques Maho
BY
Richardson, David and Nordon
ATTORNEYS

United States Patent Office 2,737,878
Patented Mar. 13, 1956

2,737,878

APPARATUS FOR AERATING AND DRYING GRANULAR MATERIALS

Jacques Maho, Larchmont, N. Y.

Application March 9, 1953, Serial No. 341,236

12 Claims. (Cl. 98—55)

The present invention, which is a continuation-in-part of my co-pending application Serial No. 138,622, filed January 14, 1950, now Patent No. 2,634,673, has for its object a method of and apparatus for aerating and drying granular materials such as grains or cereals stored in vertical chambers and warehouses or granaries with horizontal floors, as well as for all classes of merchandise intended to be stored in warehouses or the like; it also relates to constructional features of such warehouses or chambers incorporating these features.

By the methods and constructions adopted, the stored materials are subjected to air currents coming from the outside both as applied to warehouses with horizontal floors as well as in the case of the vertical cells of a chamber, in which they are stored in layers of which the thickness may be chosen as required, which layers are restricted in the upward and downward direction and are superimposed one on the other.

According to the present invention such merchandise may be aerated throughout its whole height, the external air having been previously conditioned by indirect contact with the merchandise by causing it to pass through elements interspersed therewith. Equalization of the temperature of the ventilation air and that of the merchandise permits, where applicable, the elimination or reduction of water vapor from the ventilation air taken from the outside of the warehouse and permits the direct use of the so-conditioned air for the aeration of the merchandise.

The method of the invention permits the preservation in perfect condition and in durable manner of merchandise at the point where they are stored solely by means of treatment of the air without it being necessary to transfer this merchandise from cell to cell as should be done in non-aerated granaries or warehouses which are only suitable for storage for a reduced period while in the case of aerated warehouses the merchandise may be preserved for a long time at a reduced cost.

The ventilated warehouses known heretofore have, however, the disadvantage that it is not possible to aerate the merchandise piled in the cells of the silo except through the whole height and that it is only possible to store them in warehouses with horizontal floors with a reduced layer thickness. It is not possible to aerate selectively only part of the whole storage height as is possible in accordance with the present invention. The possibility of aeration was also limited, this possibility depended on the temperature of the ventilation air taken from the outside.

Heretofore, the serious disadvantage has been encountered in the construction or operation of ventilated warehouses or granaries, cereal chambers for example, in that from the end of winter to the beginning of summer the rising temperature of the air is constantly much in advance of that of the cereals which have been cooled during winter. In this period there are few occasions when the water content of the air is sufficiently small for it to be possible to ventilate the cereals with this air without risking them being humidified by reason of the condensation of the water of the ventilation air in contact with the cereals. This disadvantage must be avoided in all cases. It should, moreover, be remarked that the various parts of the mass of cereals located through the whole height of the stock, may present differences either from the point of view of their temperature or from the point of view of their humidity. In effect, in the cell, the cereals are more compacted at the bottom than at the top by reason of the pressure to which they are subjected and in consequence it is in this base zone that the greatest resistance to aeration is encountered. Moreover, the biological heat generated by the respiration of these cereals increases in the warehouse progressively towards the top and the air, thus heated, in rising carries with it the respiration water thereby freed towards the upper zones where in consequence the water content of the cereals thus increases as well as their temperature. Account should also be taken of the influences of the temperature at the surface of the cereals, which influences are of great importance particularly in warehouses with horizontal floors. It happens frequently also that cereals from various sources are located in the same cell of a warehouse and that among them there is on occasion damaged merchandise. All these causes as well as others which may be encountered in the warehouse cell at widely different points both in height and width may cause the formation of dangerous concentration effects which would be limited and combated by rapid and intensive aeration produced locally.

By reason of the present invention these difficulties and dangers are countered and if these in themselves are insufficient they may be supplemented by suitable methods and arrangements. In the cells of vertical warehouses as well as in the cases of warehouses with horizontal floors it is possible to aerate the cereals in chosen layers selected as required for the various heights one after the other or all at the same time; that is to say, that it is possible to aerate part or all of the contents of a warehouse. In order to be able to aerate the cereals constantly even at unfavourable times from winter up to the beginning of summer, there is provided in the aeration apparatus a preliminary conditioning of the air by simple means without it being necessary to make use of mechanical parts for the refrigeration of the air and for dehydration thereof.

A particular advantage produced by the present invention resides in the provision of means which make it possible to convert existing buildings into highly efficient storehouses for grain and the like. As a matter of fact, according to one feature of the invention, a building consisting but of an outer shell, such as for instance a barn, that is not even provided with upper floors can be readily transformed into an efficiently ventilated grain storage space. Briefly, this result is obtained by the use of "imaginary" floors, i. e. networks of ventilating pipes arranged horizontally at predetermined levels inside the building. Each of these pipe networks forms an "imaginary" floor so to speak, although the pipes (aside from the ground floor) are not supported by an actual floor. On the contrary, according to the simplest form of construction the pipes (except for the ground floor) rest directly on the grain. In order to compensate for variations in the level at which the pipes are supported, flexible and/or expansible connections are used at the inlet and outlet points of the pipes. According to one embodiment of the invention, the ventilating pipes in their entirety may consist of flexible and/or expansible tubes. This construction permits standardization of ventilating pipes to be delivered to the farm, their expansible and flexible nature permitting ready adjustment to meet local requirements.

These and other objects and advantages of the present invention are more fully disclosed in the following specification. The accompanying drawings show by way of example constructional forms of warehouses, granaries or silos in which:

Figs. 3 and 4 are partial views in vertical section of a warehouse or granary with two ventilation levels;

Figure 1:
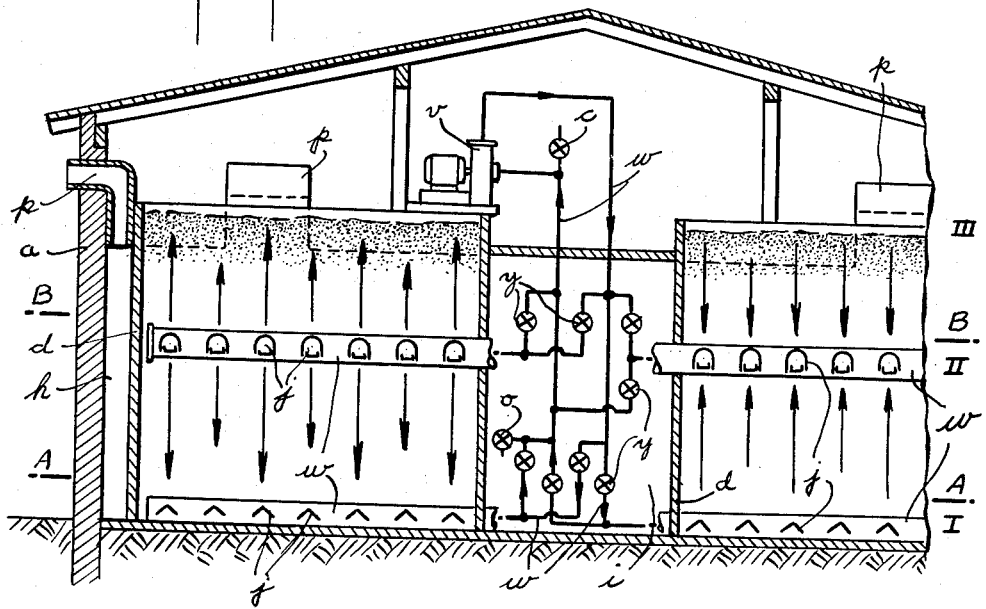
Fig. 1 is a view in partial vertical section of a warehouse or granary with two horizontal aerating units.
Figure 9:
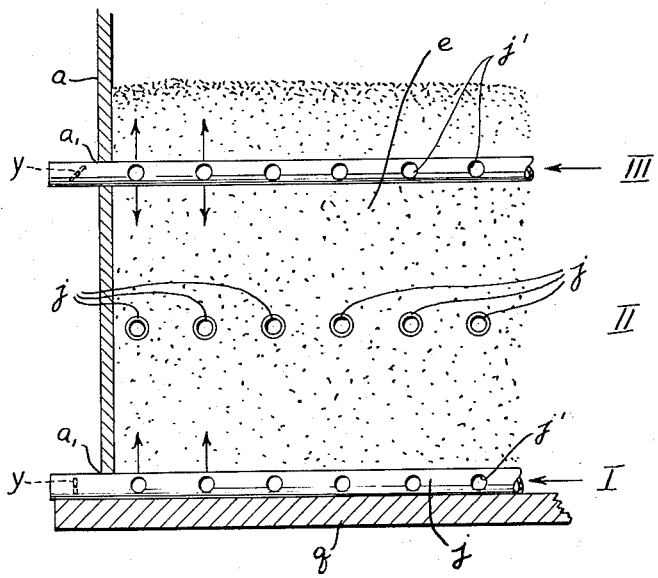
Figure 10:
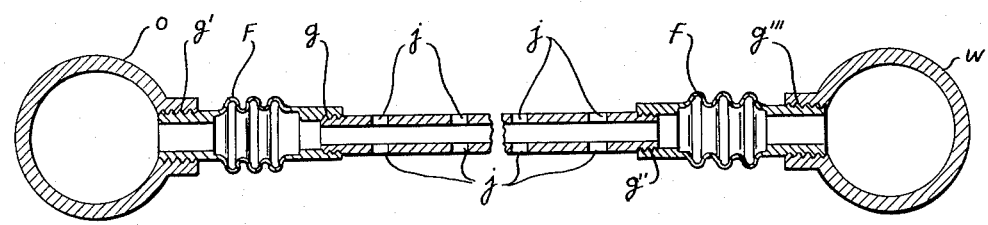
Figure 11:
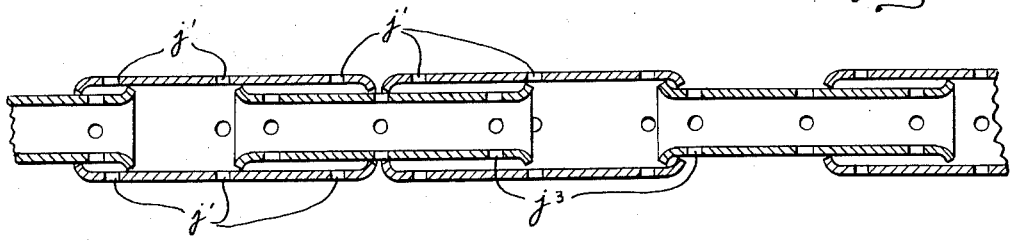

Figs. 5, 6, 7 and 8 each show, in partial view in vertical section, a warehouse or granary with three ventilation levels;

Fig. 9 illustrates a modification of the constrcution according to Fig. 1 in which the ventilating pipes at adjacent levels are disposed at right angles to each other;

Fig. 10 is a detail view of a ventilating pipe provided with expansible end pieces;

Fig. 11 is a schematic view of an expansible ventilating pipe.

Figure 2:
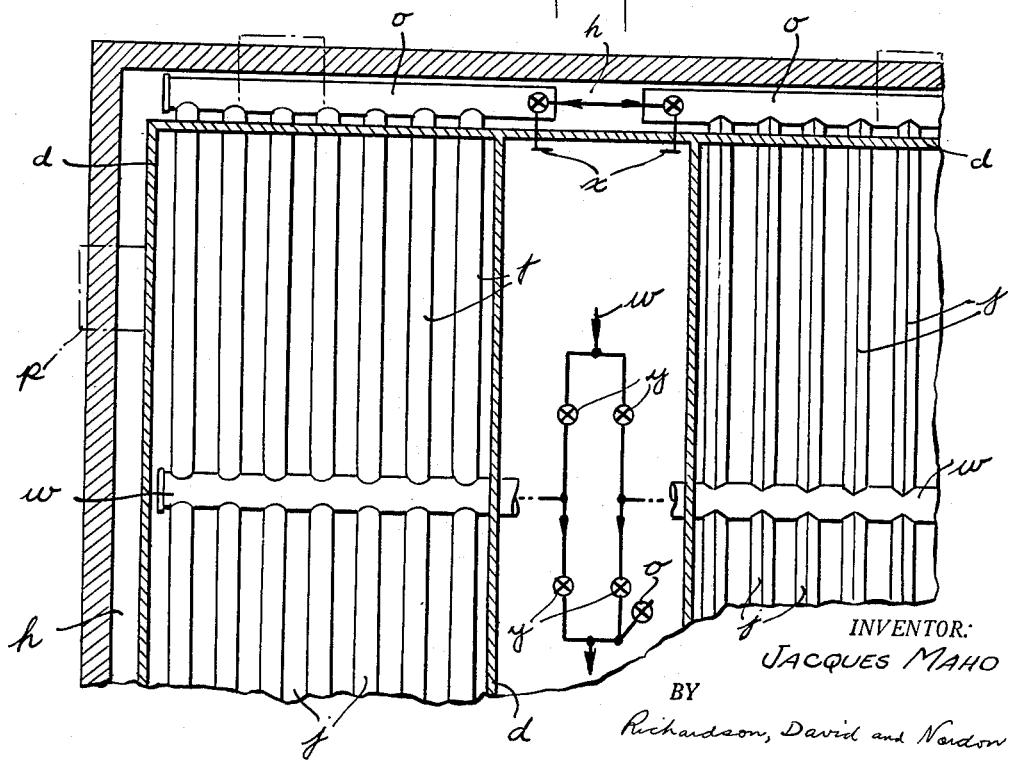
Fig. 2 is a view in partial horizontal section of a warehouse or granary with horizontal aerating units.

Figs. 1 and 2 show by way of example a horizontal warehouse or granary that is to say, Fig. 1 shows a longitudinal section through a vertical plane taken across a warehouse with horizontal floors and Fig. 2 a horizontal section of said warehouse. The portion of the drawing to the right of Fig. 2 is a horizontal section on Fig. 1 at the height of the line A—A while the left hand portion of Fig. 2 is a horizontal section of Fig. 1 on the line B—B. This warehouse also utilizes the method of the invention and effects aeration by layers of successive height of the stored cereal. It is also possible to effect the aeration of the cereals for their whole height and to effect preliminary conditioning of the ventilation air by causing the latter to enter at ports $p$ and pass through ventilation passages $h$ between the walls $d$ of the cells or rooms of the warehouse and the external wall $a$ thereof as well as the spaces $i$ between the warehouse rooms (in the case of the division of the warehouse into room or cell spaces) and more particularly also the aeration passages $j$ in the same rooms of the warehouse in question. All these aeration pipes $j$ located in the rooms are in communication both with the intake and with the outlet of the fan $v$ by means of pipes $w$ and it is the same for the ventilation passages $h$ which are connected to this fan by pipeways $o$ in Fig. 2 as well as for the spaces $i$ which are connected by the pipeways $o$ and $x$.

In Figs. 1 and 2 there are also provided in these passageways valves or other closure elements $y$ which permit the air to be caused to circulate directly in one part of the compartments of the whole warehouse and to effect the preliminary conditioning of this air for its subsequent application to the direct aeration of the cereals, in the other room spaces as well as in the ventilation passages $h$ and in the intermediate spaces $i$, this conditioning being obtained by drawing the external air through these various elements. The various similar parts of the construction are similarly designated throughout the drawings.

In Fig. 1 air within the space around the warehouse rooms and below the floor thereof may be drawn from $c$ and exhausted to the outside for replacement with fresh air, since it may have become contaminated or unduly heated in its journey.

In Figs. 1, 3 and 4 there is shown the horizontal rooms $e$ of a warehouse with two ventilation levels or stories. In Figs. 5 to 9 there are shown horizontal warehouse rooms $e$ with three levels or stories for ventilation. This arrangement of cereals may be ventilated in the various layers placed one above the other and effects a corresponding multiplication of the permissible height of filling in horizontal warehouses; it is made possible by the fact that the system of aeration passages is provided for each ventilation level, and by the fact, that besides the pipeway system on the ground floor $q$, there is provided a second system at level II, a third at level III and so on.

The aeration of the different cereal layers is effected in a vertical direction from top to bottom and from bottom to top just as desired and according to needs.

In Fig. 1 there is shown an aeration system under pressure with two levels or stories in the case on the left hand side and on the right hand side a circulation of air by suction through the whole cereal mass.

In Fig. 3 air under pressure enters at the level of the floor I and flows to level II, this outgoing heated air may be drawn again by the fan for re-circulation through the grain or it may be passed directly to the atmosphere by an orifice in the passage $w$ which may be closed, when required.

In Fig. 4 the air reaches the fan from the level II and flows therefrom vertically upwardly and through the cereals to leave the upper surface of the whole mass of cereal. After having closed the air outlet orifice for the system which is at ground level, in the pipeway $w$ the cereals in the lower zone between I and II are not subject to aeration.

In Fig. 5 the air under pressure is introduced at ground level and at level III into the room spaces, then it is evacuated at level II as well as at the upper surface of the mass of material which reaches the level IV. It relates here to aeration of the whole.

In Fig. 6 the air is introduced on leaving the fan at the level II and leaves at level III through the whole pipeway system as well as at the ground level I. The upper layer of cereals between levels III and IV remains without aeration.

In Fig. 7 the air under pressure is introduced at levels II and III and leaves at level I as well as at the upper surface of the cereals at level IV. The mid layer between the levels II and III is not ventilated.

In Fig. 8 the air under pressure is introduced at level II and leaves at level III since the outlet at ground level I is closed in the tube network $w$. It will be seen that from these examples according to the process forming the object of the present invention each layer may be aerated in the warehouses or granaries of this kind and that one can also separately aerate several layers selected as desired and, moreover, the whole mass of cereals in the warehouse.

In the arrangement according to Figs. 3 and 4 it is possible without restricting the process according to the invention merely to provide at the ground level, instead of the aeration passages a simple floor which may be traversed by air. Beneath this floor there may be provided an air expansion chamber extending below its whole surface or below several room spaces, having a common orifice for removal of the air, which orifice may be closed and which communicates with the free air or is connected with the fan.

From the point of view of the aeration technique it may be advantageous to arrange the aeration flues $j$ placed at the different levels I, II, III etc., not in directions parallel one to the other but to arrange them so that they cross at 90° or any other angle in planes situated at adjacent levels as shown in Fig. 9.

In Fig. 9, a grid or network of ventilating pipes $j$ is horizontally disposed on floor $q$. Pipe $j$ is part of a network of pipes ($j$, $o$, $w$) as shown in Fig. 2 and represents ventilation level I. Compressed air flows into pipe $j$ in the direction of the arrow and leaves pipe $j$ through perforations $j'$. Element $y$ designates a valve whereby pipe $j$ may be opened to the outer atmosphere when pipe $j$ is used as an outlet pipe, whereas valve $y$ is closed when pipe $j$ serves as air inlet pipe. In the arrangement shown in Fig. 9, valve $y$ is closed thus forcing the air to escape through aperatures $j'$ and enter the layer of grain lying between levels I and II. At level II, a similar network of pipes $j$ is disposed. It will be noted, however, that at level II, pipes $j$ are arranged at right angles to pipes $j$ of level I. The pipes $j$ of the second level have their valves y opened to the outside atmosphere (not shown) and serve as air outlet pipes. The air coming from level I enters apertures j' of the pipes j of level II whence the air escapes to the outer atmosphere. Thus, air emanating from level I is discharged. At level III a corresponding network of pipes j is arranged at right angles to pipes j of level II. Pipes j of level III receive compressed air which flows through pipes j in the direction of the arrow. The valves y of pipes j of level III being closed, the compressed air is forced out through apertures j' and travels downwardly and upwardly as shown in Fig. 9. The air which is forced downwardly will traverse the grain between levels II and III and enter apertures j' of pipes j of level II whence the air will escape to the outer atmosphere. The air escaping upwardly from level III will traverse the layer of grain superimposed on level III and on emerging from the top of the stored grain is vented to the outer atmosphere.

Fig. 9 illustrates individual valves y on pipes j of levels I and II. In other words, according to this construction each pipe j of the separate levels carries its individual valve y. However, in lieu of this arrangement, the more economical construction according to Fig. 2 may be used wherein the individual pipes j of one network of pipes are interconnected by means of pipe o, the latter being provided with a single valve y through which all interconnected pipes j can be connected to or shut off from the outer atmosphere.

It will be noted that apart from level I, the pipes j of levels II and III are supported in mid-air. Thus the network of pipes j at levels II and III form "imaginary" floors so to speak. The grain is ventilated in layers of relatively shallow depth, the same or even better than would be the case if solid floors were provided. The present invention not only saves floor construction costs, but beyond that makes it possible to readily and cheaply convert a floorless barn or other structure into an efficiently ventilated grain storage warehouse.

If a warehouse is to be especially built, it may be well to incorporate therein the double wall arrangement a, d with the inbetween air space h as shown in Figs. 1 and 2, although this special construction is not absolutely necessary and excellent results may be obtained with a single wall structure as shown in Fig. 9.

According to the invention, ventilating pipes j, o and w may consist of rigid metal or other material and the same may be permanently mounted in the building. In that case, grain is poured into storage space e up to the desired level. Any pipes j disposed above the level of the grain are then disconnected from the supply of compressed air and only the pipes j that are covered by the grain are operated in the manner described above.

However, a special advantage of the present invention resides in the fact that the ventilating pipes need not be rigid nor permanently mounted. Thus, when converting an old building having no upper floors for instance, a network of flexible and/or expansible pipes j may be used.

Fig. 10 shows a rigid ventilating pipe j provided with apertures j'. Pipe j may be connected to an expansible connecting sleeve f by means of screw thread g. The other end of sleeve f is detachably connected to venting pipe o for instance by screw thread g'. Sleeve f through its bellows-like construction makes it possible to adjust the position of pipe j at the point where it is secured to venting pipe o. For further mobility, the other end of pipe j may likewise be provided with a sleeve f by means of screw thread g'' which is screw-threaded, or otherwise detachably secured to air conveyor pipe w at g'''.

The use of expansible connecting sleeves f, which may be of any conventional construction, will be found particularly advantageous in constructions where the pipes j are not permanently mounted in the building. In such case, a network of pipes j, either flexible or rigid, is placed on the ground floor q to form level I. Then grain is piled on top of the pipes j of level I until the desired level is reached. Then a second network of pipes j is placed on top of the grain and the same are interconnected by means of expansible sleeves f (Fig. 10) and connected to a source v of compressed air and to a venting pipe o (Fig. 2); alternatively, the pipes j may project into the open atmosphere through apertures in the building wall a as shown in Fig. 9, where the valved ends y of pipes j project outside the building. After the pipes of network level II are in place, further amounts of grain may be piled on top of the pipes j of level II. This additional grain will thus lie on top of the first layer of grain and completely surround the pipes j of level II. This procedure may be continued up to the roof of the building. It will be seen that although no solid floors subdivide the building, yet "imaginary" floors are provided by the networks of pipes j at spaced apart levels.

It will be readily seen that the individual networks of pipes j have a "floating" characteristic especially where expansible sleeves f are used. The individual pipes j will adjust themselves within the mass of grain. Moreover, if apertures $a_1$ (Fig. 9) are improvised and not exactly placed, the expansible sleeve f will compensate for defects within a certain range. In view of the relatively high pressures here involved, sleeves f may consist of expansible interconnected metal sleeves or of metal armored hose or of known constructions. If desired the entire pipe j may be made of a flexible armored hose or tube or it may consist of sliding tubular elements $j_1$, $j_3$ of metal as schematically shown in Fig. 11, in order to produce both flexibility and expansibility.

Pipes or tubes j, $j_1$ (Figs. 10 and 11) are provided with apertures j' to permit ingress and egress of air. In order to prevent grain from entering the apertures j' the same may be shielded or provided with nozzles in known manner. A particularly effective type of ventilating pipe or conduit is described in my co-pending application Ser. No. 138,622, now Patent No. 2,634,673.

I am aware of the fact that the present invention may be varied or modified without departing from the spirit and scope of the invention and I wish to be understood as not limiting myself to the structural details shown and described herein.

I claim:

1. A grain storage chamber comprising a plurality of mutually vertically, spaced grids, each of said grids consisting of a plurality of interconnected perforated rigid tubes, each tube being provided with a flexible connecting sleeve at least at one of its connected ends, the lowermost of said grids resting directly on the floor of said chamber, air inlet conduit means communicating with each of said grids, a compressed air supply connected to said air inlet conduit means for supplying air to said tubes of said grids, first valve means for each of said grids, respectively, outlet means for each of said grids, respectively, and second valve means for each of said outlet means, respectively, for selectively sealing off said grids, whereby predetermined ones of said grids may be employed to introduce air into said chamber by opening of their respective first valve means and closing of their respective second valve means, while others of said grids may be employed to exhaust air from said chamber by closing their respective first valve means and opening their respective second valve means.

2. A grain storage structure comprising a first housing defining a grain storage chamber, a plurality of vertically spaced, horizontally extending grids disposed within said chamber and supported by said housing, each of said grids being made up of a plurality of interconnected perforated tubes terminating exteriorly of said chamber, the tubes of adjacent grids being disposed at right angles to each other, an air inlet conduit communicating with each of said grids, a compressed air supply connected to said air inlet conduit for supplying air to said tubes of said grids, a second housing disposed exteriorly of said first housing and provided with an air inlet opening, said first and second housings defining an air passageway therebetween, said passageway communicating with said compressed air supply, whereby atmospheric air enters said passageway and is subjected to a preliminary heat exchange with the grain within said chamber prior to being introduced into said grids through said compressed air supply, first valve means for each of said grids, respectively, outlet means for each of said grids, respectively, positioned exteriorly of said housing, and second valve means for each of said outlet means, respectively, for selectively sealing off said grids, whereby predetermined ones of said grids may be employed to introduce air into said chamber by opening of their respective first valve means and closing of their respective second valve means, while others of said grids may be employed to exhaust air from said chamber by closing their respective first valve means and opening their respective second valve means.

3. A storage chamber as claimed in claim 2, in which said grids comprise a plurality of parallel tubes.

4. A storage chamber as claimed in claim 2, in which each grid comprises a plurality of parallel tubes disposed in a plane, the tubes of adjacent grids being disposed at right angles to each other.

5. A storage chamber as claimed in claim 2, in which the tubes of the grids are rigid and are rigidly interconnected.

6. A storage chamber as claimed in claim 2, in which the tubes of the grids are flexibly interconnected.

7. A storage chamber as claimed in claim 2, in which said tubes are expansible.

8. A storage chamber as claimed in claim 2, in which said tubes are flexible and expansible.

9. A storage chamber as claimed in claim 2, in which said tubes are rigid, each tube being provided with a flexible connecting sleeve at least at one of its connected ends.

10. A storage chamber as claimed in claim 2, in which said tubes are rigid, each tube being provided with an expansible connecting sleeve at least at one of its connected ends.

11. A storage chamber as claimed in claim 2, in which said tubes are rigid, each tube being provided with a flexible and expansible connecting sleeve at least at one of its connected ends.

12. A storage chamber as claimed in claim 2, in which said tubes are rigid, a plurality of flexible sleeves, a flexible sleeve being attached to one end of each tube of each grid and to the inlet tube forming part of such grid, a further flexible sleeve being attached to the other end of each tube of each grid and to the outlet tube forming part of such grid.

References Cited in the file of this patent

UNITED STATES PATENTS

| | | |
|---|---|---|
| 98,374 | Hebert | Dec. 28, 1869 |
| 647,301 | Hollingsworth | Apr. 10, 1900 |
| 731,682 | Hillig | June 23, 1903 |
| 1,239,216 | Randolph | Sept. 4, 1917 |
| 1,728,951 | Appel | Sept. 24, 1929 |
| 2,027,268 | Davis | Jan. 7, 1936 |
| 2,126,107 | Gordon | Aug. 9, 1938 |
| 2,358,423 | Stone | Sept. 19, 1944 |